United States Patent [19]

Scharre et al.

[11] 4,135,802
[45] Jan. 23, 1979

[54] CASSETTE FOR LIGHT-SENSITIVE PHOTOGRAPHIC MATERIAL

[75] Inventors: Normann Scharre, Munich; Siegfried Bartel, Gauting, both of Fed. Rep. of Germany

[73] Assignee: AGFA-Gevaert AG, Leverkusen, Fed. Rep. of Germany

[21] Appl. No.: 850,025

[22] Filed: Nov. 9, 1977

[30] Foreign Application Priority Data

Nov. 11, 1976 [DE] Fed. Rep. of Germany ....... 2651407

[51] Int. Cl.² ............................................ G03B 17/26
[52] U.S. Cl. ..................................... 354/275; 354/211
[58] Field of Search ............... 354/211, 275, 276, 277, 354/297, 310, 311, 5; 206/455; 242/71.7; 352/75; 355/64, 72

[56] References Cited

U.S. PATENT DOCUMENTS 4,052,731  10/1977  Powers ................................. 354/275

FOREIGN PATENT DOCUMENTS 606058  11/1934  Fed. Rep. of Germany ........... 354/211
762768   5/1954  Fed. Rep. of Germany ........... 354/275

Primary Examiner—John Gonzales
Assistant Examiner—Thomas H. Tarcza
Attorney, Agent, or Firm—Michael J. Striker

[57] ABSTRACT

A cassette for light-sensitive photographic material which is to be transferred between the cassette and a copying apparatus having one or more doors which can be opened and closed. The cassette has a housing provided with an open side which can be closed by a removable cover, and it also has a wall provided with a slot connectable to an opening of the copying apparatus. A pair of rollers is mounted inwardly adjacent the slot and at least one of these can move towards and away from the other roller between one position in which the rollers define a gap for passage of the photographic material and another position in which the rollers bear upon each other and form a seal against the entry of light from the slot into the cassette. An arrangement is provided which automatically moves the movable roller into the sealing position in response to placement of the cover on the open side and another arrangement automatically moves the movable roller to the gap-defining position in response to closing of the door or doors of the copying apparatus to which the cassette is connected.

10 Claims, 2 Drawing Figures

CASSETTE FOR LIGHT-SENSITIVE PHOTOGRAPHIC MATERIAL

BACKGROUND OF THE INVENTION

1. Field of the Invention

The present invention relates to a cassette for light-sensitive photographic material, and more particularly to a cassette for such material (which may be present in the cassette in form of a roll) which is to be transferred to a copying apparatus after the cassette has been connected to the same.

2. The Prior Art

It is known from the field of photographic copying or duplicating to provide cassettes which are loaded in a darkroom with light-sensitive photographic material (e.g. copy paper) and which are then removed from the darkroom to be connected to a copying apparatus outside the darkroom, e.g. a copying apparatus which is located in daylight. Since the access of light to the photographic material would spoil this material, such cassettes are connected to the copying apparatus in such a manner that no light can enter them and thereupon the photographic material is then transferred from the cassette into the copying apparatus for making copies in the same.

From German Pat. No. 762,768 a cassette is known having an outlet opening through which the light-sensitive photographic material issues to enter into a copying apparatus with which the cassette is light-tightly connected. Since, as is self-evident, the photographic material in the cassette must also be protected against the entry of light during its transfer from the darkroom (where the cassette has been loaded) to the copying apparatus to which it is to be connected, such cassettes must be provided with a sealing arrangement which prevents the entry of light into their interior. In the cassette according to the aforementioned German patent a set of rollers is provided adjacent the outlet of the photographic material. These rollers move into light-sealing engagement with one another while the cassette is not connected to the copying apparatus, and subsequent to its connection to such an apparatus they can be moved apart from one another (to permit free passage of the photographic material between them) by means of an electromagnetic arrangement that is provided for this purpose. This prior-art proposal does in fact provide a satisfactory seal for the cassette to prevent spoiling of the photographic material within the cassette by the entry of unwanted light. However, the arrangement needed to achieve this effect, including the electromagnetic device and the associated components, is rather expensive to produce and is also susceptible to malfunctions because it is comparatively complicated.

SUMMARY OF THE INVENTION

Accordingly, it is an object of the present invention to avoid the aforementioned disadvantages.

More particularly, it is an object of the present invention to provide an improved cassette for light-sensitive photographic material of the type in question, wherein the sealing and unsealing of the opening for the photographic material is effected in a simpler and less expensive manner than heretofore.

Another object of the invention is to provide such a cassette wherein the arrangement for sealing and unsealing the opening for the photographic material is so simple as to be totally or at least substantially free of malfunctions.

In pursuance of these objects, and others which will become apparent hereinafter, one feature of the invention resides in a cassette for light-sensitive photographic material which is to be transferred between the cassette and a copying apparatus having at least one door that is movable between an open and a closed position. Briefly stated such a cassette may comprise a housing having an open side and a wall provided with a slot connectable to an opening of the copying apparatus, and a removable cover for the open side. A pair of rollers is located inwardly adjacent the slot and at least one of these rollers is mounted for movement towards and away from the other roller between one position in which the rollers define a gap for passage of the photographic material, and another position in which the rollers bear upon each other and form a seal against the entry of light from the slot into the cassette. First means are provided for effecting movement of the movable roller to the other position thereof in response to placement of the cover on the open side, and second means are provided for effecting movement of the movable roller to its one position in response to movement of the door of the copying apparatus to the closed position thereof.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
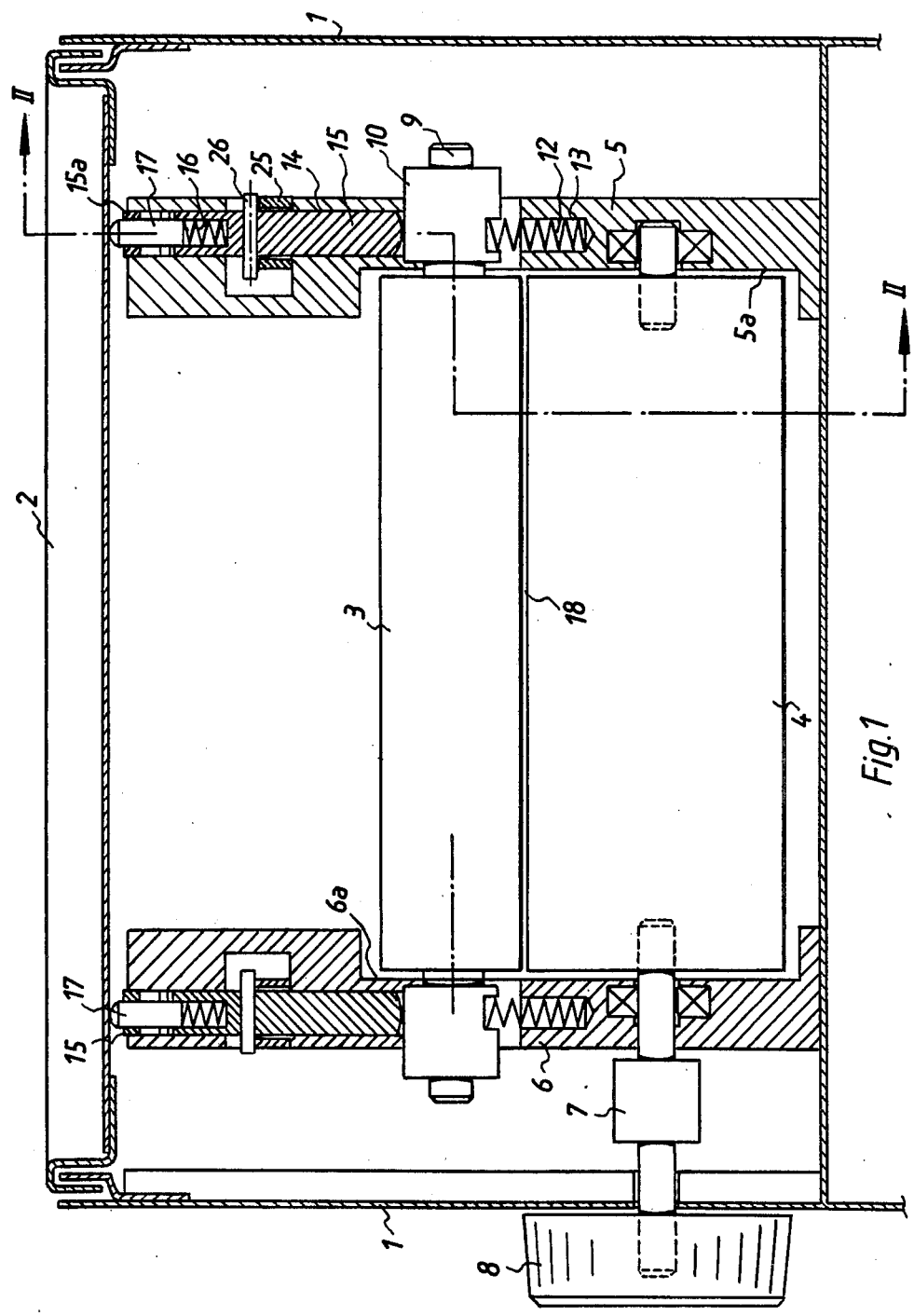
FIG. 1 is a fragmentary cross-section through the light-sealing arrangement of a cassette according to the present invention.
Figure 2:
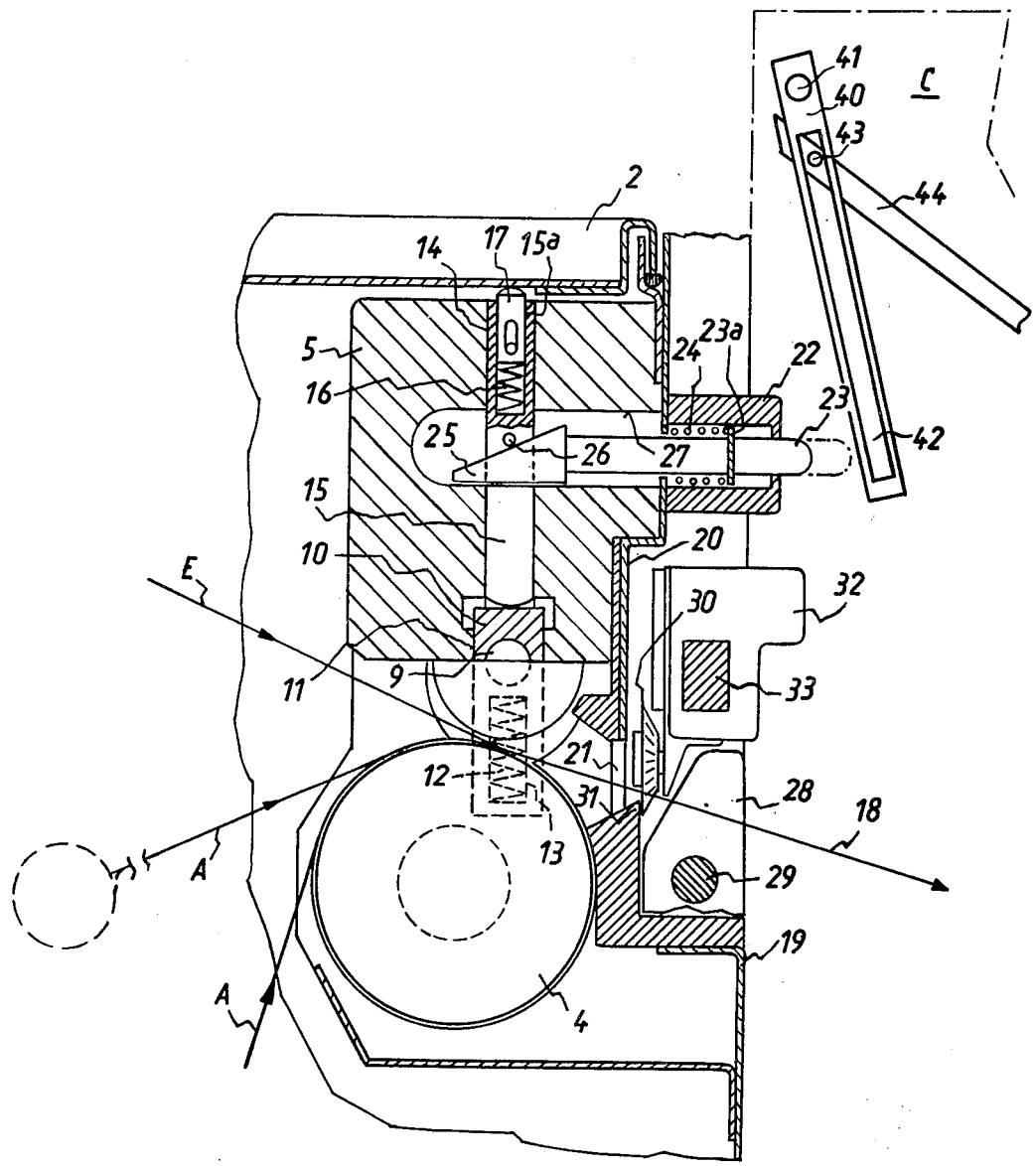
FIG. 2 is a section taken on line II—II of FIG. 1.

It should be understood that the cassette according to the present invention is illustrated only fragmentarily in FIGS. 1 and 2. That is to say that only those portions of the cassette have been shown wherein the sealing arrangement according to the present invention is provided; those portions of the cassette which accommodate the coil or roll of photographic material that is to be transferred between the cassette and a copying apparatus have not been illustrated because they are conventional in accordance with what is known from the art.

With the above in mind it will be seen that reference numeral 1 in FIG. 1 identifies side walls of a cassette according to the present invention, whereas reference numeral 2 in FIGS. 1 and 2 identifies a removable cover which closes an open side (e.g. top) of the cassette in a light-tight manner. One of the walls of the cassette is provided with an outlet slot 21 (which is elongated in direction normal to the plane of FIG. 2) through which the light-sensitive photographic material 18 leaves the cassette to enter into a photographic copying apparatus which is diagrammatically and fragmentarily indicated at C in FIG. 2. Of course, it is to be understood that the cassette according to the present invention can equally well be used to take-up a web (e.g. strip) of photographic material, not only to pay it out, e.g. photographic copying paper.

Located inwardly of the slot 21 is a pair of rollers 3, 4. The roller 4 is mounted for rotation about its central axis (see FIG. 1) and can be driven in rotation, e.g. by means of the coupling 7 shown in FIG. 1 which is connected to a manually turnable knob 8 located outwardly adjacent one of the side walls 1 of the cassette. The roller 4 as well as the roller 3 are both journalled for rotation in lateral supporting walls 5, 6 which are provided with depressions 5a and 6a, respectively, to accommodate end portions of the rollers 3 and 4 and to serve as light-traps.

The journalling of the roller 3 is symmetrical in the walls 5 and 6, so that details referring to the journalling of one end of the rollers 3 will suffice and should be understood to be applicable also to the journalling of the other end of the roller 3. The roller 3 has the central shaft 9 which is journalled at each end portion in a journal or bearing 10 for rotation. The bearing 10 in turn is shiftable (compare FIG. 2) in a more or less vertical guide 11 formed in the wall 5 (and in the wall 6 correspondingly) so that the journal 10 can move towards and away from the axis of rotation of the roller 4 in radial or substantially radial direction. Each journal 10 is biased away from the axis of rotation of the roller 4 by a spring 12 which is in part received in a recess 13 of the respective support wall 5, 6 and which bears upon the journal 10, thus tending permanently to displace the journal and the roller 3 away from the roller 4. Also formed in the side wall 5 (and correspondingly in the side wall 6) in axial alignment with the recess 13 and with the guide 11 is a respective bore 14 which is, however, located at the side of the journal 10 which is opposite the recess 13. In this bore 14 a pin 15 is slidably received and is long enough to extend almost to the cover 2. The free end of the respective pin 15 is provided with a blind bore 15a in which an expansion spring 16 is received, as well as a small pin 17 which is secured (see FIG. 2) against coming loose from the blind bore 15a.

When the cover 2 is placed onto the open side of the cassette it depresses the pins 17 inwardly so that they enter into the respective blind bore 15a while compressing the respectively associated spring 16. As soon as a sufficient degree of compression of spring 16 has been reached, the pin 15 begins to slide inwardly in the bore 14 and presses against the associated journal or bearing 10 which is now pressed (against the force of the spring 12) towards the roller 4, thereby displacing the roller 3 against the (larger-diameter) roller 4. At this time the cassette is of course already loaded with the photographic material that has been placed into it in the darkroom where the cover 2 is also placed onto the cassette, and as a rule the leading end of the photographic material will be lodged in the gap between the rollers 3, 4 so that when the roller 3 is pressed against the roller 4 in the manner described above, the rollers will press from opposite sides against the leading end of the light-sensitive material 18, thus providing a seal against the entry of light from the slot 21 to those portions of the light-sensitive material (i.e. the just loaded coil thereof) which are located inwardly of the rollers 3, 4. The cassette can now be removed from the darkroom and taken to a copying apparatus which is located in daylight or in a lighted room.

After the cassette has been secured in known manner to the opening of the copying apparatus so that a light-tight connection has been established between them, the knob 8 is turned to thereby advance the leading end of the light-sensitive material 18 to the requisite extent into the interior of the copying apparatus, i.e., until it can be engaged by the intake rollers or transport rollers of the same. Thereafter, the door or doors of the copying apparatus are closed and, in accordance with the present invention, this movement is utilized to move the rollers 3, 4 apart again.

The fragmentary sectional view in FIG. 2 shows the cassette wall 19 which in operation will be placed against a cooperating wall of the only diagrammatically illustrated copying apparatus C, the latter of course being provided with a suitable opening which is not illustrated because it is conventional and known in the art. The cassette wall 19 is provided with a depression 20 within which the slot 21 is formed. A guide 22 is provided in which a pin 23 is movable in substantially horizontal direction. The pin 23 is provided with a shoulder 23a (e.g. a circlip) and an expansion spring 24 is confined between the shoulder 23a and the cassette wall 19, tending to permanently move the pin 23 to the position shown in broken lines. The copying apparatus C is provided with an arrangement which moves in response to movement of the door or doors of the apparatus to closed position, and in so doing depresses the pin 23 from the broken line position to the solid line position. The details of this arrangement of the copying apparatus C are not essential for an understanding of the invention as embodied in the novel cassette. However, the arrangement may for example be in form of a lever 40 which is pivoted at 41 and provided with a slot 42 in which a pin 43 of a further lever 44 is slidable. Thefurther lever 44 may then be connected with one of the doors of the copying apparatus in such a manner that it moves (downwardly in FIG. 2) in response to movement of the door to close position, thereby pivoting the lever 40 in clockwise direction and causing it to press against the pin 23 and to displace the same from the broken line position to the solid position. Of course, the arrangement may also be different from what has been illustrated, as long as it is capable of depressing the pin 23 to the solid line position thereof in response to closing of a door of the copying apparatus.

The inner end of the pin 23 is bifurcated, carrying two wedge portions 25 (only one is visible) which are located at opposite lateral sides of the pin 15. The latter is provided with transversely extending projections 26 (a transverse pin 26 may be mounted in the pin 15 with its ends projecting laterally of the pin 15) and these projections 26 are engageable by the inclined cam surfaces of the wedge member 25. Thus, when the pin 23 is depressed inwardly from the broken-line to the solid-line position in FIG. 2, the inclined surfaces of the wedge members 25 engage the projections 26 and displace the pin 15 (upwardly in FIG. 2) in direction away from the roller 4. This causes the bearings 10 associated with the respective pins 15 to be displaced in the same sense so that the roller 3 is moved away from the roller 4 and a gap is opened between them through which the light-sensitive material 18 can freely pass. The wedge members 25 (both of the pins 15 may advantageously have a set of the wedge members 25 and a pin 23 associated with it) slide on the bottom wall of a recess 27 in the supporting wall 5, which recess is aligned with the opening in the guide 22.

From the above it will be appreciated that after the cassette has been connected to the diagrammatically illustrated copying apparatus C and the roller 4 has been turned by means of the knob 8 to advance the light-sensitive material 18 to the first set of transporting rollers (not shown) of the apparatus C, and after the doors of the copying apparatus C have then been closed, the arrangement 40–44 of the apparatus C depresses the pin 23 to the solid-line position. This causes the inclined surfaces on the wedge members 25 to engage the projections 26 and lift the pins 15 in direction away from the roller 4, moving the roller 3 away from the roller 4 also. The material 18 can now be readily withdrawn from the cassette by means of the transporting rollers of the copying apparatus C. Advantageously the spring forces of the springs 12 and 13 are so selected that the respective pin 15 will be displaced away from the roller 4 without thereby causing the small pins 17 to push the cover 2 off the cassette. However, if necessary or if it is desired not to have to pay attention to these relative spring forces, an arrangement may be provided for latching the cover 2 in place on the cassette so as to positively prevent any undesired displacement of the cover.

With the cassette according to the present invention it is now a simple matter to load the light sensitive material 18 into the cassette in a darkroom and to advance the leading end of the material into the gap between the rollers 3, 4 whereupon the cover 2 is put in place on the cassette, resulting in automatic closing of the gap between the rollers 3, 4 and sealing of the cassette against the entry of light. The cassette can now be freely taken to a lighted room and there connected to a copying apparatus. It is understood in the art that such copying apparatuses are kept in lighted rooms since their operation in darkrooms would be too difficult and cumbersome. The cassette is then connected to an opening provided on the copying apparatus for this purpose and when the access doors of the copying apparatus are thereupon closed (eliminating dange of incoming light to the photographic material) this results in automatic movement of the rollers 3 and 4 apart so that the light-sensitive material 18 can then be readily drawn into the copying apparatus C by the transporting rollers of the same. Of course, as soon as the doors of the copying apparatus are opened again, the movement described above with respect to FIG. 2 is reversed, i.e. the pin 23 can move back to its broken-line position and the rollers 3, 4 will automatically re-establish a seal against entry of light into the cassette.

In addition to the advantages already outlined, it is a further advantage of the cassette according to the present invention that it can be used with light-sensitive photographic material of different widths, thus making it unnecessary to have different cassettes for different-width materials. In view of this versatility the cassette according to the present invention is advantageously provided adjacent the slot 11 (advantageously outwardly adjacent thereof) with slidable guide elements 28 (one shown) which may be slidable lengthwise of the slot 21 on a rod 29 mounted on or in the cassette. These elements 28 are then shifted along the rod 29 until they define between themselves a space the width of which corresponds to the width of the particular light-sensitive material 18 that is at any given time located in the cassette. This assures that even if the roll of material in the cassette is not properly installed, the material will be aligned to its proper position by the guide elements 28 as it passes through the slot 21 so as to assure that it will assume its proper position relative to slots 21 as well as to the openings of the copying apparatus C.

In addition, it is advantageous if a rotary cutter 30 is provided outwardly adjacent the slot 21 to make it possible to cut off the leading end of the material 18 at right angles to elongation of the same. As FIG. 2 shows the rotary cutter (blade) 30 cooperates with an edge 31 on the cassette so that between them they cut-off the leading end of the material 18 if and when desired or necessary. The cutter 30 is mounted on a handle 32 which in turn is supported on a bar 33 of the cassette which bar 33 extends lengthwise of the slot 21 and on which the handle 32 can be shifted back and forth to thereby move the cutter 32 and effect cutting of the material 18.

By way of example two possible directions of movement have been indicated at A in FIG. 2 for the material 18, and character E indicates a possible direction of movement for the material 18 when it is first placed with its leading end between the rollers 3, 4 after having been loaded into the cassette. The diagrammatically illustrated (broken-line) roll indicates merely for purposes of orientation that a roll of the material 18 will be located in those parts of the cassette which have not been shown in detail.

It goes without saying that although the cassette has been shown of the type that can be secured laterally to a side wall of a copying apparatus C, the invention is not limited to such an embodiment. Quite evidently, the cassette according to the present invention could also be so constructed that it can be connected to a top wall or a bottom wall of a copying apparatus C, this being governed entirely by whether the opening for the inlet of the material 18 is provided in a side wall, top wall or a bottom wall of the apparatus C.

While the invention has been illustrated and described as embodied in a cassette for light-sensitive photographic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cassette for light-sensitive photographic material which is to be transferred between the cassette and a copying apparatus having at least one door which is movable between an open and a closed position, comprising a housing having an open side and a wall provided with a slot connectable to an opening of the copying apparatus; a removable cover for said open side; a pair of rollers inwardly adjacent said slot, at least one of said rollers being mounted for movement towards and away from the other roller between one position in which said rollers define a gap for passage of the photographic material, and another position in which said rollers bear upon each other and form a seal against the entry of light from said slot into said cassette; first means for effecting movement of said one roller to said other position in response to placement of said cover on said open side; and second means for effecting movement of said one roller to said one position in response to movement of said door of said copying apparatus to the closed position thereof.

2. A cassette as defined in claim 1, said one roller comprising a pair of bearings journalling it at its opposite end portions; further comprising guides mounting said bearings for movement substantially radially of the other roller; and biasing means permanently biasing said bearings in said guides in direction away from said other roller.

3. A cassette as defined in claim 2, said biasing means comprising motion-transmitting pins slidable in said guides, and biasing springs bearing upon said pins.

4. A cassette as defined in claim 3, said motion-transmitting pins each having an end portion facing towards said open side and provided with a recess, and an expansion spring partly received in said recess and having a spring force greater than that of the respective biasing spring bearing upon the associated motion-transmitting pin, said expansion springs each having an outer end portion which bears at least indirectly upon said cover when the same is placed on said open side.

5. A cassette as defined in claim 4; further comprising a contact pin carried by each of said outer end portions for contact with said cover.

6. A cassette as defined in claim 4, wherein said second means comprises elements for displacing said motion-transmitting pins in direction transversely away from said other roller in response to movement of said door of the copying apparatus to the closed position thereof.

7. A cassette as defined in claim 6, said elements comprising a member guided in said housing for movement responsive to closing of said door and provided with at least one cam surface, and cam-followers on said motion-transmitting pins and engageable with said cam surface in response to movement of said member.

8. A cassette defined in claim 7, said member being movable between an inoperative and an operative position in which said cam surface is respectively out of and in engagement with said cam followers, and means biasing said member to said inoperative position thereof.

9. A cassette as defined in claim 1; further comprising a trimmer blade mounted adjacent said slot and movable lengthwise of the same for trimming a leading end of said light-sensitive photographic material.

10. A cassette as defined in claim 1; and further comprising guide elements mounted adjacent said slot and being movable lengthwise thereof so as to between themselves reduce the free length of said slot to a dimension corresponding to the width of said light-sensitive photographic material.

* * * * *